May 13, 1958 R. E. GUNTHER 2,834,546
CALCULATING DEVICES
Filed Jan. 18, 1957
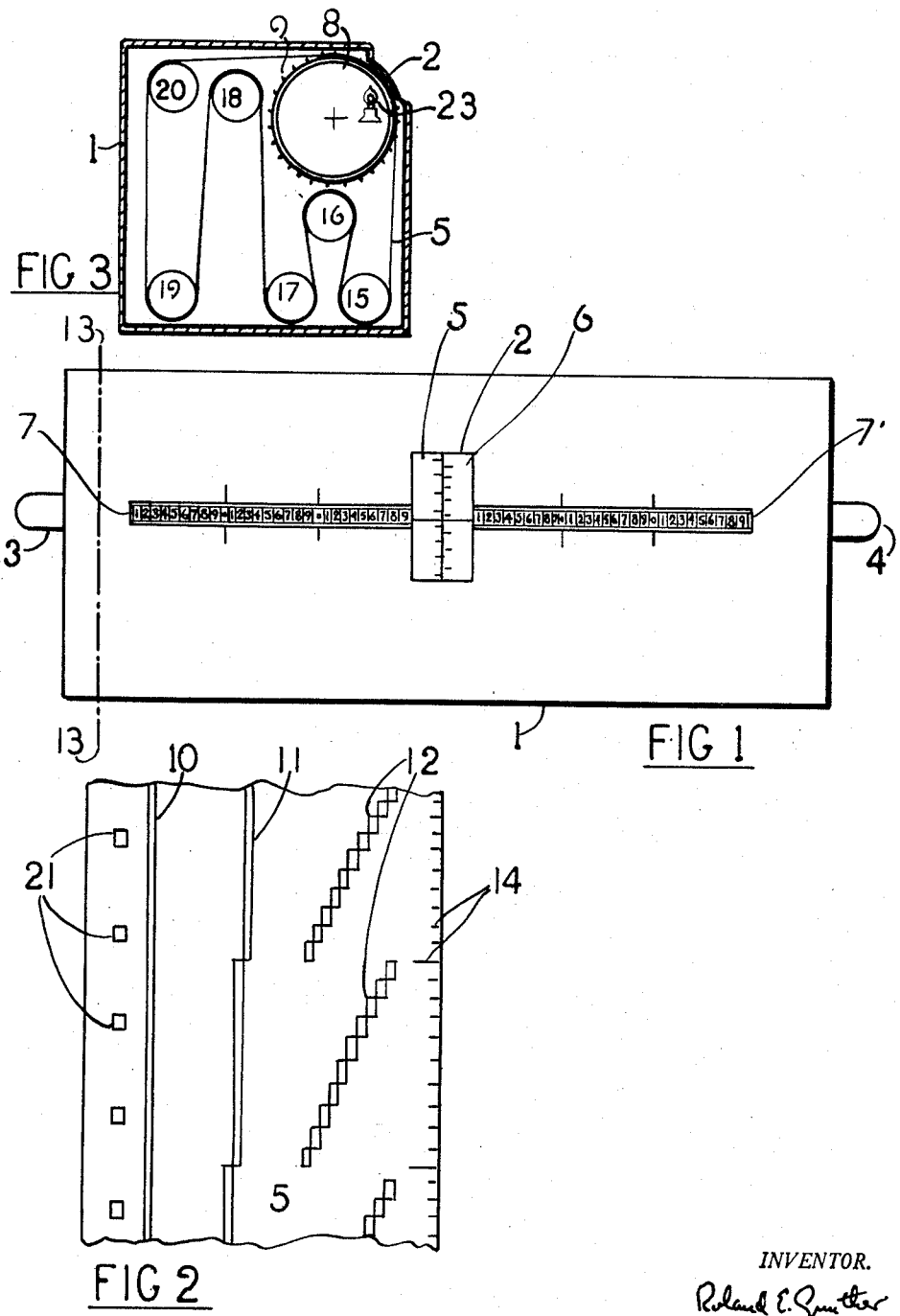
INVENTOR.
Roland E. Gunther

United States Patent Office 2,834,546
Patented May 13, 1958

2,834,546

CALCULATING DEVICES

Roland Eric Gunther, Princeton Junction, N. J.

Application January 18, 1957, Serial No. 634,896

6 Claims. (Cl. 235—71)

This invention relates to calculating devices, and more particularly to devices employing adjacent calibrated bands bearing indicia and operated on a slide rule principle, with the bands capable of being moved over adjacent toothed drums, either independently or together as the calculating operation may require.

The conventional linear or circular slide rule has limitations imposed on the accuracy possible in the calculations possible by the short length of the scales. Efforts to overcome this have resulted in the design of calculators using extended scales inscribed on tapes or bands, with these latter running over toothed drums or discs much as moving picture film is run. It is a fact, however, that in order to get one more readable figure from a scale one must multiply the scale length by ten, and this means that to get worthwhile improvement over a ten inch slide rule, a tape or band type rule must provide a scale that is 100 inches long. This is entirely feasible, but the operation without some aids becomes decidedly cumbersome, as one can not easily read the moving tape as it is being moved over the drum, and slowing down the tape makes for loss of time which the device is meant to save.

It is an object of this invention to provide a slide rule type of calculating device with unusually long scales, which still affords relative ease of operation and read-out of the scales.

It is another object of this invention to provide an extended scale slide rule type of calculating device that automatically indicates all but the last two digits of a scale reading, and in some cases may show all but the last digit.

In the following specification and the accompanying drawings these and other objects, and the manner in which they are achieved will be elucidated.

In the drawings, Figure 1 shows a frontal view of a form of the invention.

Figure 2 shows in detail a portion of one of the calibrated bands of the calculator.

Figure 3 shows a sectional view of the interior of the device.

In Figure 1 are shown a housing 1 and in the housing 1 a hairline indicating reader 2 similar to that in conventional slide rule calculators. Visible within the window of the indicator 2 are portions of two calibrated bands 5 and 6. Extending across the housing 1 on the left of the indicator 2 is a line of inscribed windows 7 and on the right of the indicator 2 is a similar row of inscribed windows 7'. Partially visible in the drawing Fig. 1 on the left side of the housing 1 is a knob 3 which may be used to turn a drum not shown, over which runs the band 5, and partially visible on the right side of the housing 1 is a similar knob which may be used to turn another drum, also not visible, over which runs the band 6. A line 13—13 is shown in Fig. 1 to indicate where a section is taken for a subsequent view.

Figure 2 shows a portion of one of the belts, belt 5. On the belt 5 in this view, which is to be understood to be normally opaque, are shown three series of light conductive stripes 10, 11 and 12, and in addition, a line graduated scale 14. Each stripe in the series 10 is of the same length as one unit graduation in the line graduated scale 14, and preferably laterally disposed and exactly aligned with the division in the scale 14 to which it corresponds. The stripes that individually make up the series 11 each measure the exact length of one of the first subdivisions on the scale 14, and the component stripes in the series 11 are also preferably exactly disposed to the side from the unit subdivision to which each one corresponds. If any deviation in alignment was chosen to be made in the series 10, the same must be observed in series 11. Series 12 corresponds to the next subdivisions on the scale 14 and the requirements outlined for the previous series 10 and 11 are also held for series 12 and any subsequent series that might be found useful.

In addition to the indicia borne on the band 5 shown in Fig. 2 there is also shown a series of perforations 21 similar to those found on moving picture film, which serve to transport the band in a controlled manner over a correspondingly toothed drum.

Figure 3 shows a sectional view of the device shown in Fig. 1 taken on the line 13—13 in Fig. 1. Shown in Fig. 3 is the band 5 in edge view, and also shown are idlers 16, 17, 18, 19, 20 over which the band 5 runs. The idler system 16, 17, 18, 19, 20 comprise a sort of magazine to take up the long band 5. Shown also in this view is the hairline indicator window 2 and a drum 8. The drum 8 is provided with a toothed periphery 9, the teeth being so spaced as to correspond with the perforations in the band 5 shown in Fig. 2. Also indicated in Fig. 3 is a light source represented by the bulb 23. The main body of the drum 8 is made of transparent or translucent material to permit passage of light through it from the source 23.

Basically the operation of the device is similar to that of a conventional slide rule, with the scales in this case on the belts 5 and 6 and on their adjacent edges as seen in the frame of the hairline indicator 2 in Figure 1. The scales may be moved independently or by convenient means the drums on which the bands 5 and 6 operate may be held together and turned together. However, since the belts are made long, as show in Figure 3 in order to provide greater accuracy, and only a small section of each belt may be seen at any time in the window of the indicator 2 an additional read-off system is provided. This is done by means of the light 23 of Figure 3 the windows 7, 7' and the light conductive stripes such as 10, 11, 12 with which the bands are provided.

For a conventional Mannheim scale type calculator the windows 7, 7' are inscribed in groups of numbers from 0 to 9, there being one group of numbers for every major, intermediate and minor division of the Mannheim scale whose actual physical length is greater than the height of the windows 7, 7'. The light conductive stripes in the series such as 10, 11, 12 on belt 5 in Fig. 2 are laterally disposed so that the stripes appear in the windows inscribed with the number corresponding to the immediate value of the Mannheim scale subdivision that each stripe represents. Since there is a light 23 behind the bands, and the drums on which the bands run are made of transparent or translucent material the coincidence of a stripe appearing behind a window causes the particular window to light up and show the number inscribed upon it.

The result of the numbered windows lighting up in correspondence with the scale values passing the indicator is that the bands may be moved very rapidly until the sought for first digit is visible in lighted form, slowing up the speed of the moving band only very little until the second digit appears in the proper window, and so forth until one is down to very fine subdivisions which may then be read off under the hairline with more care.

I claim,

1. In a calculating device of the band scale slide rule type, the combination of a housing, a hairline read-out indicator, said hairline readout indicator mounted in said housing, a plurality of essentially transparent drums, said drums axially and rotatably mounted in said housing, said drums being peripherally provided with sets of regularly spaced teeth, a plurality of essentially opaque bands, said bands so placed as to run on said drums, said bands provided with regularly spaced perforations, said perforations corresponding to said teeth on said drums, each said band bearing a calibrated scale, and each said band bearing a pattern of light-conductive horizontal stripes; the said housing provided with a plurality of windows, said windows laterally extended across said housing essentially in line with the hairline on said hairline read-out indicator, said windows being laterally disposed and positioned over the said pattern of light conductive stripes on said bands; the said pattern of light conductive stripes consisting of distinct stepped-off groups of stripes, with the leftmost of the said groups on each said band comprising individual stripes, each of said individual stripes being of exactly the same physical length as one of the full unit divisions of said calibrated scale, and the next to leftmost of said groups comprising second degree individual stripes, each of said second degree individual stripes being of exactly the same physical length as one of the first unit subdivisions on the said calibrated scale, each following said group being placed to the right of each previous said group, and each following group representing in the same said manner the subsequent subdivisions of said calibrated scale until the physical lengths of the said individual stripes become less than the dimension of height of the said windows in said housing, and further the said windows being inscribed to bear indicia corresponding to the readings of units and of major and of intermediate and of minor subdivisions of units which the said calibrated scale as well as the laterally displaced segmented forms of the said calibrated scale represented by the said groups of stripes, there being an individual said stripe in the said pattern for every said calibrated scale division of physical length greater than the said limit imposed by the said window height; further, the said stripes in the said pattern being so aligned with respect to the said windows over each said band that lateral coincidence is established between each individual said stripe and that particular said window bearing a said inscribed value equal to the immediate value of the division of said calibrated scale to which the individual said stripe is equal in length; and further, a light source, said light source positioned behind said essentially opaque bands in said housing in the vicinity of said windows, and said light source capable of illuminating whichever of said windows that may be uncovered by the alignment with said window of any said light conductive stripe in said bands.

2. In a calculating device of the band scale slide rule type, the construction of claim 1 wherein the said calibrated scales comprise Mannheim type log scales.

3. In a calculating device of the band scale slide rule type, the construction of claim 1 wherein the said calibrated scales comprise logarithmic scales of decimal system numbers as well as logarithmic scales of mathematical functions.

4. In a calculating device of the band scale slide rule type, the combination of a housing, a hairline read-out indicator, said indicator mounted in said housing, a plurality of essentially transparent drums, said drums axially and rotatably mounted in said housing, said drums being peripherally provided with sets of regularly spaced teeth; a plurality of essentially opaque bands, said bands positioned to run on said drums, said bands provided with regularly spaced perforations, said perforations corresponding to said teeth on said drums, each said band bearing a calibrated scale, and each said band bearing a pattern of light conductive stripes; the said housing provided with a plurality of windows, said windows laterally extending across said housing essentially in line with the hairline on said indicator, said windows inscribed with indicia, said indica representing the calibrations on the said calibrated scale, said indicia being sequentially inscribed, one said index per said window in order of descending magnitude of the said scale calibrations which the said inscriptions represent; the said pattern of light conductive stripes on each said band being located by areas of coincidence on the said belt between divisions on an imaginary extension of the said calibrated scale across said band and those areas on said band uncoverable by those said windows bearing the same said inscribed values as the immediate values of the said scale divisions; and further, a source of light, said light positioned behind said essentially opaque bands in said housing, and said light capable of illuminating any said window when one of the light conductive stripes in said bands is aligned with one of the said windows.

5. In a calculating device of the band scale slide rule type the construction of claim 4 wherein the said calibrated scales comprise Mannheim type log scales.

6. In a calculating device of the band scale slide rule type the construction of claim 4 wherein the said calibrated scales comprise logarithmic scales of decimal system numbers as well as logarithmic scales of mathematical functions.

No references cited.